(12) United States Patent
Li

(10) Patent No.: US 12,208,532 B1
(45) Date of Patent: Jan. 28, 2025

(54) PORTABLE SOFT MATERIAL CUTTING DEVICE

(71) Applicant: SHENZHEN JINGWEIXIAN TECHNOLOGY CO., LTD, Guangdong (CN)

(72) Inventor: Jianglin Li, Guangdong (CN)

(73) Assignee: SHENZHEN JINGWEIXIAN TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/885,588

(22) Filed: Sep. 14, 2024

(30) Foreign Application Priority Data

Aug. 28, 2024 (CN) .......................... 202411195838.0

(51) Int. Cl.
| *B26D 5/06* | (2006.01) |
|---|---|
| *B23Q 15/007* | (2006.01) |
| *B26D 5/00* | (2006.01) |

(52) U.S. Cl.
CPC ............. *B26D 5/06* (2013.01); *B23Q 15/007* (2013.01); *B26D 5/005* (2013.01)

(58) Field of Classification Search
CPC . B26D 5/02; B26D 5/06; B26D 5/005; B23Q 15/007; B25J 9/0078; B25J 9/1045; B26F 1/3813; B23C 1/20; B23K 26/10; B23K 26/0884
USPC ........................................................ 248/662
See application file for complete search history.

(56) References Cited

U.S. PATENT DOCUMENTS

| 3,864,997 | A | * | 2/1975 | Pearl ........................ | B26D 5/00 |
|---|---|---|---|---|---|
| | | | | | 83/756 |
| 4,301,999 | A | * | 11/1981 | Higgins ................. | B26F 1/3806 |
| | | | | | 269/21 |
| 4,327,596 | A | * | 5/1982 | Simon ..................... | F16H 19/06 |
| | | | | | 346/139 B |
| 4,793,033 | A | * | 12/1988 | Schneider .............. | D06C 23/02 |
| | | | | | 83/100 |
| 5,508,936 | A | * | 4/1996 | King ......................... | B26F 1/38 |
| | | | | | 382/296 |
| 5,836,224 | A | * | 11/1998 | Gerber ..................... | B26D 7/04 |
| | | | | | 83/451 |
| 5,975,743 | A | * | 11/1999 | Bercaits ................. | B26D 5/007 |
| | | | | | 700/134 |
| 6,192,777 | B1 | * | 2/2001 | Williams .............. | B26F 1/3813 |
| | | | | | 83/56 |
| 6,308,602 | B1 | * | 10/2001 | Gerber ..................... | B26D 7/18 |
| | | | | | 83/276 |

(Continued)

*Primary Examiner* — Eret C McNichols
(74) *Attorney, Agent, or Firm* — Daniel M. Cohn; Howard M. Cohn

(57) ABSTRACT

A portable soft material cutting device is provided, including a main body, at least two cables, at least one cable reeling module, at least two cable fixtures, and a control module. The main body is placed on a worktable surface and includes a cutting assembly and at least one traction mechanism. The at least one cable reeling module is disposed on the main body or the worktable surface, and the at least two cables are connected to the at least one cable reeling module. The at least two cable fixtures are disposed on the worktable surface, each of the at least two cables is connected to a corresponding one of the at least two cable fixtures. The at least two cables are coupled to the at least one traction mechanism for transmission.

10 Claims, 12 Drawing Sheets

(56) References Cited

U.S. PATENT DOCUMENTS

| | | | | |
|---|---|---|---|---|
| 6,772,661 | B1* | 8/2004 | Mikkelsen | B26D 7/27 |
| | | | | 83/75 |
| 8,042,425 | B2* | 10/2011 | Dujardin | B25J 9/104 |
| | | | | 74/490.09 |
| 9,847,045 | B2* | 12/2017 | Campolo | A61H 1/0274 |
| 10,843,301 | B2* | 11/2020 | Joos | B26D 1/045 |
| 11,331,789 | B2* | 5/2022 | Penn | B25J 9/023 |
| 11,865,713 | B2* | 1/2024 | Vachon | B25J 9/0018 |
| 12,084,317 | B2* | 9/2024 | Bramberger | B66C 13/46 |
| 12,090,502 | B2* | 9/2024 | Zi | B25J 11/0075 |
| 2005/0172764 | A1* | 8/2005 | Fagan | B23K 37/0235 |
| | | | | 83/13 |
| 2015/0251267 | A1* | 9/2015 | Winn | B23K 10/00 |
| | | | | 83/76.1 |
| 2024/0001574 | A1* | 1/2024 | Li | B26D 7/00 |
| 2024/0083019 | A1* | 3/2024 | Vachon | B25J 11/00 |

* cited by examiner

PORTABLE SOFT MATERIAL CUTTING DEVICE

TECHNICAL FIELD

The present disclosure relates to a portable soft material cutting device, and belongs to a technical field of soft material cutting processing.

BACKGROUND

Currently, methods for cutting soft fabrics are various, including manual cutting, laser cutting, waterjet cutting, electronic cutting, etc., and for enterprises that have needs of mass production, the laser cutting and the electronic cutting are generally adopted. Specifically, the laser cutting involves focusing a high-energy density laser beam onto a cutting area to enable a surface material of the cutting area to be rapidly melted, vaporized, ablated, or reach an ignition point thereof, meanwhile, a high-speed gas flow, such as oxygen or nitrogen, being coaxial with the high-energy density laser beam is provided to blow away molten materials, thereby forming a cut on the cutting area. The electronic cutting is also known as numerical cutting or computer numerical control (CNC) cutting, and is a method utilizing a CNC technology to control a cutting machine for accurately cutting soft materials. In the electronic cutting, a computer controls a motion path of the cutting machine through pre-designed graphics or data for accurately cutting the soft materials. The electronic cutting is suitable for various soft materials, such as paper, plastic, rubber, etc., and the electronic cutting offers significant advantages in material cutting applications requiring mass production and high precision.

However, conventional laser cutting and electronic cutting both employ CNC machine tools, the CNC machine tools are generally large in size, thereby occupying large space and requiring much space for placement and operation, so that the CNC machine tools are limited by a need of enough space, moreover, the CNC machine tools are further limited by a processing range, the CNC machine tools cannot handle parts that exceed their own dimensions.

SUMMARY

To address above shortcomings in the prior art, the present disclosure aims to provide a portable soft material cutting device that is compact and easy to carry, not limited to a designated location, and is capable of directly working on a flat surface or an inclined surface of a worktable to be processed, the portable soft material cutting device is moved through pulling cables to perform cutting or processing on parts with various sizes, which is suitable for various types of cutting and processing, a wide application range is provided.

In order to achieve above aims, the present disclosure provides the portable soft material cutting device, including a main body, at least two cables, at least one cable reeling module, at least two cable fixtures, and a control module. The main body is placed on a worktable surface and includes a cutting assembly and at least one traction mechanism. The at least one cable reeling module is disposed on the main body or the worktable surface, and the at least two cables are connected to the at least one cable reeling module. The at least two cable fixtures are disposed on the worktable surface, each of the at least two cables is connected to a corresponding one of the at least two cable fixtures. The at least two cables are coupled to the at least one traction mechanism for transmission. The control module is configured to control the at least one traction mechanism to pull the at least two cables, and the at least one cable reeling module is configured to reel the at least two cables in and out, so as to control the main body to move on the worktable surface and further control the cutting assembly to operate on the worktable surface.

Furthermore, four cable reeling modules and two cables are provided, each two of the four cable reeling modules are respectively disposed at two ends of a corresponding one of the two cables, and the four cable reeling modules are disposed on the main body. Four cable fixtures are provided, the four cable fixtures are respectively disposed at four corners on the worktable surface, each of the two cables is connected to corresponding two of the four cable fixtures. Four traction mechanisms are further provided, each of the four traction mechanisms is disposed between a corresponding one of the four cable fixtures and a corresponding one of the four cable reeling modules, and corresponding two of the four traction mechanisms are connected to the corresponding one of the two cables.

Furthermore, four cable fixtures and four cables are provided. A first end of each of the four cables is connected to the at least one cable reeling module, a second end of each of the four cables is connected to a corresponding one of the four cable fixtures. A middle portion of each of the four cables is coupled to the at least one traction mechanism for transmission.

Furthermore, two cable fixtures and two cables are provided, a first end of each of the two cables is connected to the at least one cable reeling module, a second end of each of the two cables is connected to a corresponding one of the two cable fixtures, the at least one traction mechanism is disposed between the two cable fixtures and the at least one cable reeling module and is connected to the two cables.

Furthermore, the control module is disposed on the main body, or wirelessly interacts with the main body.

Furthermore, the four cable reeling modules respectively include four winding drums, the two cables are respectively connected to the four winding drums, four elastic reset components are respectively disposed in the four winding drums, an inner ring of each of the four winding drums is connected to a movable end of a corresponding one of the four elastic reset components, a fixed end of each of the four elastic reset components is connected to the main body, elastic reset force of the four elastic reset components keep the two cables taut and wound on the four winding drums.

Furthermore, the main body includes a first supporting component and a second supporting component. Two traction mechanisms are provided, the two traction mechanisms are disposed between the first supporting component and the second supporting component. Each of the two traction mechanisms includes a transmission roller component, a driving component, and limiting roller components. Each transmission roller component is rotatable and is disposed between the first supporting component and the second supporting component. Each driving component is coupled to a corresponding transmission roller component to drive the corresponding transmission roller component to rotate. Each of the two cables is looped in a U-shape around one half-circle of the corresponding transmission roller component, corresponding limiting roller components are respectively disposed at two sides of the U-shape, the corresponding limiting roller components are rotatable and are disposed between the first supporting component and the second supporting component to prevent a corresponding one of the two cables from slipping off the corresponding transmission roller component.

Furthermore, each of the at least two cable fixtures includes a cable support, each cable support is detachably connected to the worktable surface, and a transfer connector for connecting to a corresponding one of the at least two cables is disposed on a top portion of each cable support.

Furthermore, each of the at least two cable fixtures further includes a clamping base, each clamping base is detachably connected a corresponding cable support, and each clamping base includes a clamping portion for clamping the corresponding one of the at least two cables to limit displacement of the corresponding one of the at least two cables.

Furthermore, each of the at least two cable fixtures further includes a limiting component, each transfer connector is rotatably connected to the corresponding cable support, and each limiting component is configured to limit rotation of a corresponding transfer connector.

Furthermore, the cutting assembly includes a lifting and driving mechanism, a cutting tool, and a power component for driving the cutting tool. A sliding base is disposed at a sliding end of the lifting and driving mechanism, the sliding base is rotatably connected to the cutting tool. The power component is disposed at the sliding base and is coupled to the cutting tool for transmission, the lifting and driving mechanism drives the cutting tool to slide in a vertical direction, the power component provides power to the cutting tool to drive the cutting tool to cut downward, so as to cut materials on the worktable surface.

Furthermore, the main body further includes a pad, the pad slides in contact with the worktable surface or a surface of a soft material to be processed, the pad is disposed at a bottom portion of the second supporting component, a first movable opening is defined on a middle portion of the pad, second movable openings are respectively defined on a middle portion of the first supporting component and a middle portion of the second supporting component for matching the cutting assembly. The cutting assembly passes through the first movable opening and the second movable openings to cut the materials on the worktable surface.

Compared with the prior art, beneficial effects of the present disclosure are as follows.

In the present disclosure, the at least one reeling module is provided to pull the main body onto the worktable surface, the control module controls the at least one traction mechanism to reel the at least two cables in and out, so as to control the main body to move on the worktable surface and further control the cutting assembly to operate on the worktable surface. The portable soft material cutting device of the present disclosure is compact and easy to carry, not limited to the designated location, and is capable of directly working on the flat surface or the inclined surface of the worktable to be processed, the portable soft material cutting device is moved through pulling the at least two cables to perform cutting or processing on the parts with various sizes, which is suitable for the various types of the cutting and the processing, the wide application range is provided.

Moreover, in the cutting assembly of the present disclosure, the lifting and driving mechanism drives the cutting tool to move in the vertical direction, thereby controlling a cutting depth on the worktable surface, and the at least two cables are configured to pull the main body to move, so that users may cut desired shapes or patterns on a surface to be processed as required. Specifically, the cutting tool is selected from a scribing tool for marking lines, a laser processing tool, a CNC processing tool, a die-cutting too, etc., so that the portable soft material cutting device of the present disclosure is suitable for various cutting and processing operations to enable a wide usage range.

Figure 1:
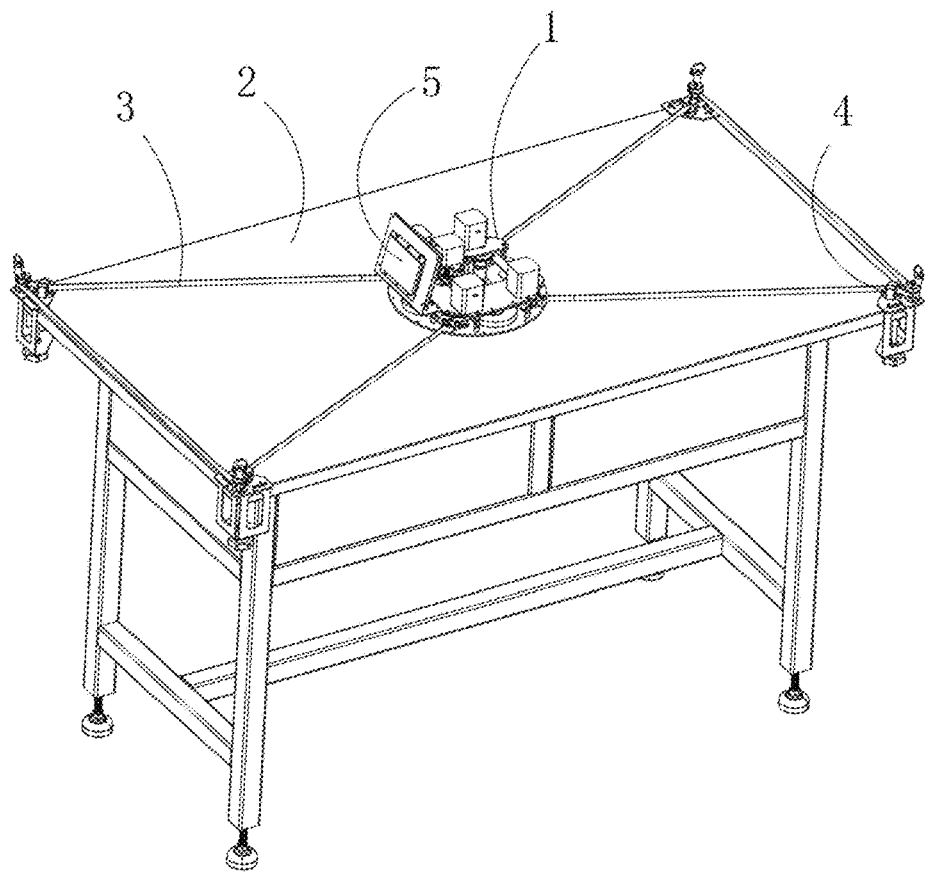
FIG. 1 is a structural schematic diagram of a portable soft material cutting device according a first embodiment of the present disclosure where the portable soft material cutting device is disposed on a worktable surface.

Reference numerals in the drawings: 1. main body; 11. cutting assembly; 111. lifting and driving mechanism; 1111. sliding end; 112. cutting tool; 113. power component; 12. traction mechanism; 121. transmission roller component; 122. driving component; 123. limiting roller component; 124. driven gear; 125. driving pulley; 126. driven pulley; 127. synchronous belt; 128. synchronous belt locking mechanism; 1281. rocker arm; 1282. tension roller; 1283. bending portion; 13. first supporting component; 131. arc-shaped travel slot; 14. second supporting component; 141. second movable opening; 15. housing cover; 16. pad; 161. first movable opening; 162. sliding ring; 2. worktable surface; 3. cable; 31. cable reeling module; 311. winding drum; 312. elastic reset component; 32. cable clamp; 321. cable clamp body; 3211. through groove; 3212. first channel;

3213. second channel; 3214. bend; 322. cable clamp cover; 4. cable fixture; 41. cable support; 411. clamping opening; 4111. squeezing component; 42. transfer connector; 421. first limiting wheel; 4211. limiting groove; 422. second limiting wheel; 423. fixing pin; 43. clamping base; 431. clamping portion; 44. limiting component; 5. control module.

DETAILED DESCRIPTION OF EMBODIMENTS

In order to enable those who skilled in the art to better understand technical solutions in the present disclosure, the technical solutions in embodiments of the present disclosure are clearly and completely described below with reference to accompanying drawings in the embodiments of the present disclosure. Apparently, the described embodiments are only a part but not all of the embodiments of the present disclosure. All other embodiments obtained by those who skilled in the art based on the embodiments of the present disclosure without creative efforts shall fall within a protection scope of the present disclosure.

It should be noted that when a component is referred to as being "fixed to" or "disposed on" another component, the component may be directly or indirectly disposed on another component; when the component is referred to as being "connected to" another component, the component may be directly connected to another component or indirectly connected to another component.

It should be understood that terms including "length", "width", "upper", "lower", "front", "rear", "left", "right", "vertical", "horizontal", "top", "bottom", "inner", "outer", etc. are merely used to facilitate describing the present disclosure and simplify description, rather than indicating or implying that a device or component indicated must have a specific orientation or must be constructed and operated in a specific orientation, and therefore cannot be understood as a limitation to the present disclosure.

In addition, terms including "first" and "second" are used for descriptive purposes only and cannot be understood as indicating or implying relative importance or implicitly indicating a number of indicated technical features. Thus, features defined with "first" and "second" may explicitly or implicitly include one or more of the features. In the description of the present disclosure, "a plurality of" or "several" means two or more, unless otherwise specifically defined.

It should be noted that structures, proportions, sizes, etc. shown in the drawings of the present specification are only used to cooperate with a content disclosed in the specification for those who skilled in the art to understand and read, and are not intended to limit limiting conditions that is implemented in the present disclosure, and therefore, any modification on the structures as disclosed in the present disclosure, change on proportional relationships as disclosed in the present disclosure, and adjustment on the sizes as disclosed in the present disclosure should still fall within a scope covered by a technical content disclosed in the present disclosure without affecting effects and objectives that can be achieved in the present disclosure.

The present disclosure aims to solve technical problems in the prior art that employ computer numerical control (CNC) machine tools employed for conventional laser cutting and electronic cutting are generally large in size, thereby occupying large space and requiring much space for placement and operation, the CNC machine tools are limited by a need of enough space and are further limited by a processing range, the CNC machine tools cannot handle parts that exceed their own dimensions.

Based on above, the present disclosure aims to provide a portable soft material cutting device that is compact and easy to carry, not limited to a designated location, and is capable of directly working on a flat surface or an inclined surface of a worktable to be processed, the portable soft material cutting device is moved through pulling cables to perform cutting or processing on parts with various sizes, which is suitable for various types of cutting and processing, a wide application range is provided.

In the embodiments, flexible materials include flexible fabrics, films, leather, paper, etc., differing from conventional rigid materials typically requiring fixtures for fixing during processing, the soft materials need to be laid flat on a worktable and fix each corner thereof when using the portable soft material cutting device of the present disclosure for cutting, for example, the flexible fabrics need to be kept taut and a surface of the worktable need to stay flat. Conventional CNC machine tools all have specific size ranges for processing, and any material exceeding their own dimensions cannot be processed. In contrast, the portable soft material cutting device of the present disclosure is limited by a travel length of each of cables. According to dimensions of the soft materials to be processed, a surface of a worktable larger than or equal to the dimensions of the soft materials to be processed is selected to affix the portable soft material cutting device for cutting the soft materials. There are no restrictions on whether the surface of the worktable is a horizontal plane or an inclined plane; using the inclined plane facilitates removal of cuttings from the surface of the worktable.

Referring to FIGS. 1-14, the portable soft material cutting device is provided, including a main body 1, at least two cables 3, at least one cable reeling module 31, at least two cable fixtures 4, and a control module 5. The main body 1 is placed on a worktable surface 2 and includes a cutting assembly 11 and at least one traction mechanism 12. The at least one cable reeling module 31 is disposed on the main body 1 or the worktable surface 2, and the at least two cables 3 are connected to the at least one cable reeling module 31. The at least two cable fixtures 4 are disposed on the worktable surface 2, each of the at least two cables 3 is connected to a corresponding one of the at least two cable fixtures 4. The at least two cables 3 are coupled to the at least one traction mechanism 12 for transmission. The control module 5 is configured to control the at least one traction mechanism 12 to pull the at least two cables 3, and the at least one cable reeling module 31 is configured to reel the at least two cables 3 in and out, so as to control the main body 1 to move on the worktable surface 2 and further control the cutting assembly 11 to operate on the worktable surface 2.

In the embodiments, the control module 5 is selected from a control module based on programmable logic controller (PLC), a single-chip control module, or a control module based on Field-Programmable Gate Array (FPGA).

It should be noted that the at least two cable fixtures are disposed on the worktable surface 2 and are detachably fixed to edges or corners of the worktable surface 2, serving as reference points for pulling the main body 1.

Referring to FIG. 1, in the embodiments, four cable reeling modules 31 and two cables 3 are provided, each two of the four cable reeling modules 31 are respectively disposed at two ends of a corresponding one of the two cables 3, and the four cable reeling modules 31 are disposed on the main body 1. Four cable fixtures 4 are provided, the four cable fixtures 4 are respectively disposed at four corners on the worktable surface 2, each of the two cables 3 is connected to corresponding two of the four cable fixtures 4. Four traction mechanisms 12 are further provided, each of the four traction mechanisms 12 is disposed between a corresponding one of the four cable fixtures 4 and a corresponding one of the four cable reeling modules 31, and corresponding two of the four traction mechanisms 12 are connected to the corresponding one of the two cables 3. Two of the four cable reeling modules 31 are respectively disposed at tails ends of the two cables 3, and a corresponding one of the four cable reeling modules 3 is disposed at each end of the two cables, and when a portion of the two cables 3 wound on any one of the four cable reeling modules 31 is fully unwound, a travel of a corresponding cable 3 is completed. Specifically, the control module 5 calculates an extension length required by each of the two cables 3 and a working range of each of the two cables 3 that can be used according to a size of the worktable surface 2 input to the control module 5 by a user input. Intermediate portions of each of the two cables 3 are respectively mounted on two transfer connectors 42 of the corresponding two of the four cable fixtures 4, each two transfer connectors 42 serve as nonrotatable synchronous wheels and stretch the two cables 3 to enable suitable tightness of the two cables. The four traction mechanisms 12 control the four cable reeling modules 31 to simultaneously and respectively reel in the two cables 3 until the two cables 3 are tightened, and at this time, the main body 1 is pulled to a center of the worktable surface 2, which is an origin of a machining coordinate. A control instruction is input to the control module 5, the control module 5 drives a cutting end of the cutting assembly 11 to move downward, and a rotating cutter or a rolling blade at the cutting end performs cutting or processing on the soft materials.

Figure 2:
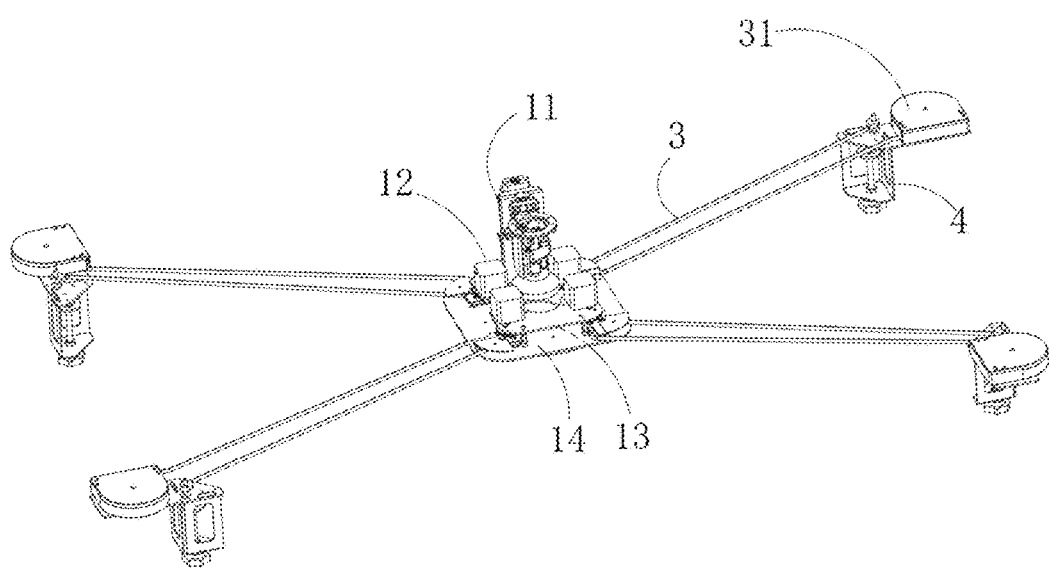
FIG. 2 is a structural schematic diagram of the portable soft material cutting device according to a second embodiment of the present disclosure.

As shown in FIG. 2, in some embodiments, four cable fixtures 4 and four cables 3 are provided. A first end of each of the four cables 3 is connected to the at least one cable reeling module 31, a second end of each of the four cables is connected to a corresponding one of the four cable fixtures 4. A middle portion of each of the four cables 3 is coupled to the at least one traction mechanism 12 for transmission. The at least one cable reeling module 31 is detachably disposed on the main body 1, or four cable reeling modules 31 are provided, and the four cable reeling modules 31 are respectively detachably disposed on the four cable fixtures 4. Specifically, detachably providing the four cable reeling modules 31 on the four cable fixtures 41 enable a lighter weight and lower energy consumption of the main body 1. It should be noted that the second end of each of the four cables 3 is capable of being detachably connected to the corresponding one of the four cable fixtures 4 through a snap-fit, pin, or clamp, so as to be secured to the corresponding one of the four cable fixtures 4.

In some embodiments, two cable fixtures 2 and two cables 3 are provided, a first end of each of the two cables 3 is connected to the at least one cable reeling module 31, a second end of each of the two cables 3 is connected to a corresponding one of the two cable fixtures 4, the at least one traction mechanism 12 is disposed between the two cable fixtures 4 and the at least one cable reeling module 31 and is connected to the two cables 3. When the two cable fixtures 4 are provided, a movement of the main body 1 is linear, the main body 1 linearly moves to drive the cutting assembly to perform linear tracing or cutting on the soft materials.

Referring to FIG. 1, specifically, the control module 5 is disposed on the main body 1, or wirelessly interacts with the main body, or is remotely connected to the main body 1 through wires and control the main body 1 through the wires.

Figure 3:
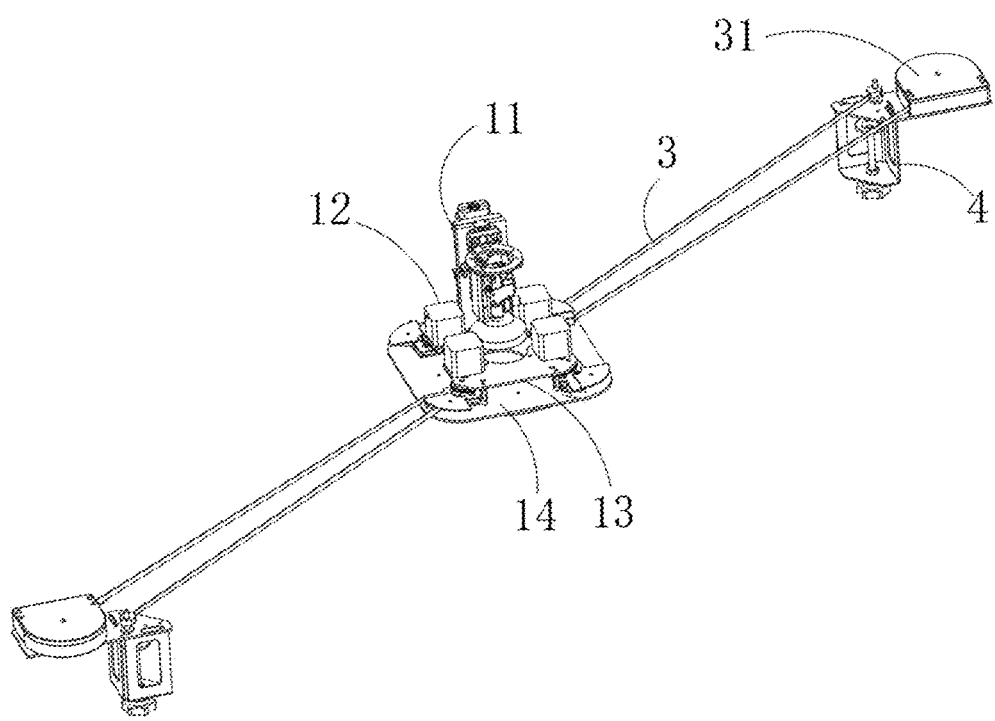
FIG. 3 is a structural schematic diagram of the portable soft material cutting device according to a third embodiment of the present disclosure.
Figure 4:
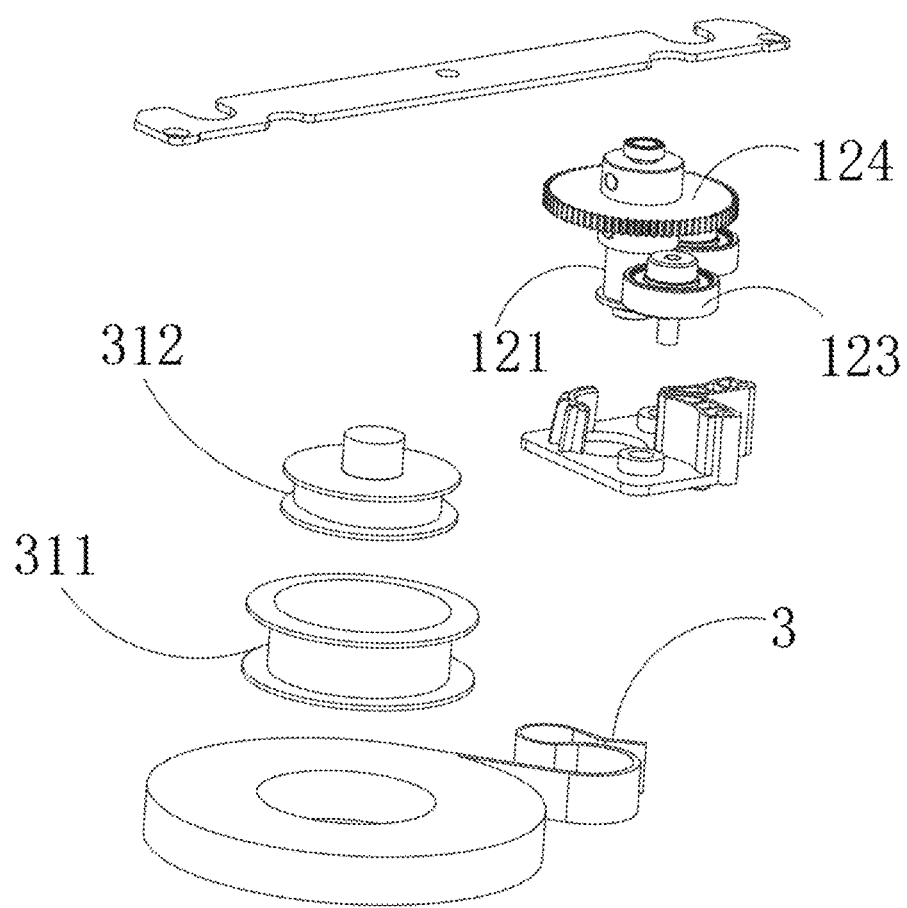
FIG. 4 is an exploded structural schematic diagram of a cable reeling module according to one embodiment of the present disclosure.

Referring to FIGS. 3-4, specifically, the four cable reeling modules 31 respectively include four winding drums 311, the two cables 3 are respectively connected to the four winding drums 311, four elastic reset components 312 are respectively disposed in the four winding drums 311, an inner ring of each of the four winding drums 311 is connected to a movable end of a corresponding one of the four elastic reset components 312, a fixed end of each of the four elastic reset components 312 is connected to the main body 1, elastic reset force of the four elastic reset components 312 keep the two cables 3 taut and wound on the four winding drums 311. The four cable reeling modules 31 in the embodiment belong to the prior art, and are not described in detail herein.

Referring to FIGS. 3-7, specifically, the main body 1 includes a first supporting component 13 and a second supporting component 14. Two traction mechanisms 12 are provided, the two traction mechanisms 12 are is disposed between the first supporting component 13 and the second supporting component 14. The at Each of the two traction mechanisms 12 includes a transmission roller component 121, a driving component 122, and limiting roller components 123. Each transmission roller component 121 is rotatable and is disposed between the first supporting component 13 and the second supporting component 14. Each driving component 122 is coupled to a corresponding transmission roller component 121 to drive the corresponding transmission roller component 121 to rotate. Each of the two cables 3 is looped in a U-shape around one half-circle of the corresponding transmission roller component 121, corresponding limiting roller components 123 are respectively disposed at two sides of the U-shape, the corresponding limiting roller components 123 are rotatable and are disposed between the first supporting component 13 and the second supporting component 14 to prevent a corresponding one of the two cables 3 from slipping off the corresponding transmission roller component 121. Also, corresponding limiting roller components 123 are capable of securing the corresponding one of the two cables against both sides of the U-shape.

Figure 5:
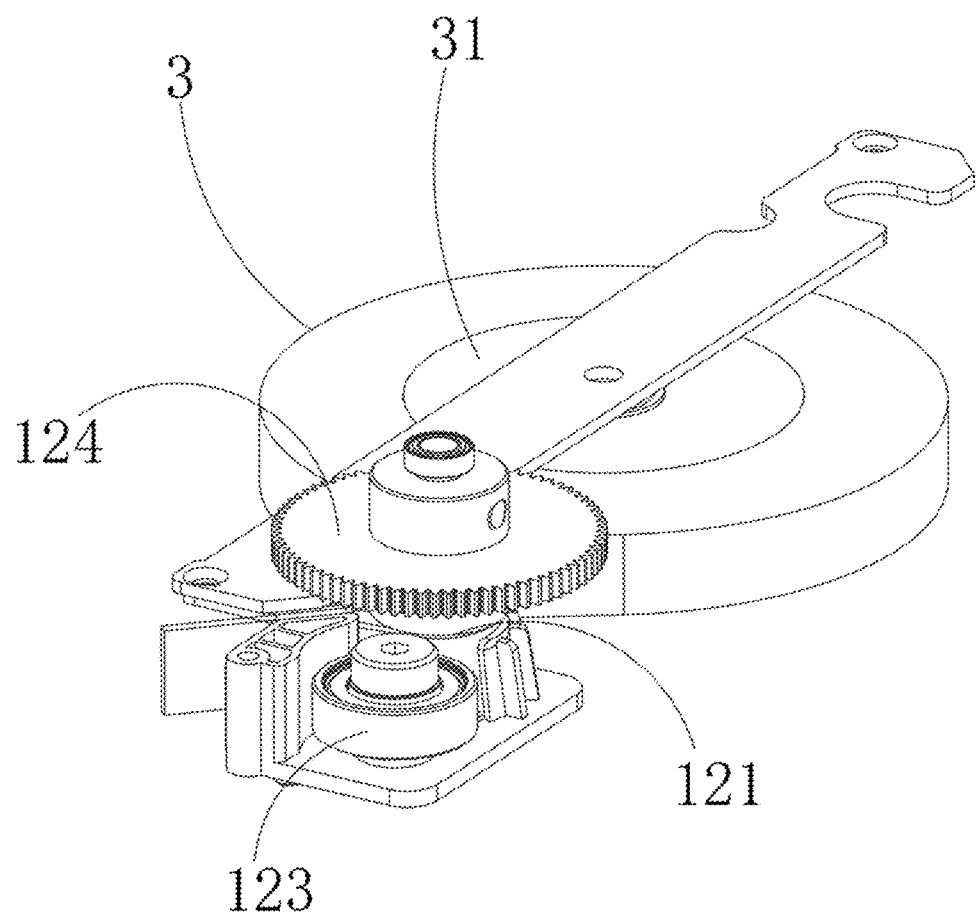
FIG. 5 is a structural schematic diagram of the cable reeling module according to one embodiment of the present disclosure.
Figure 6:
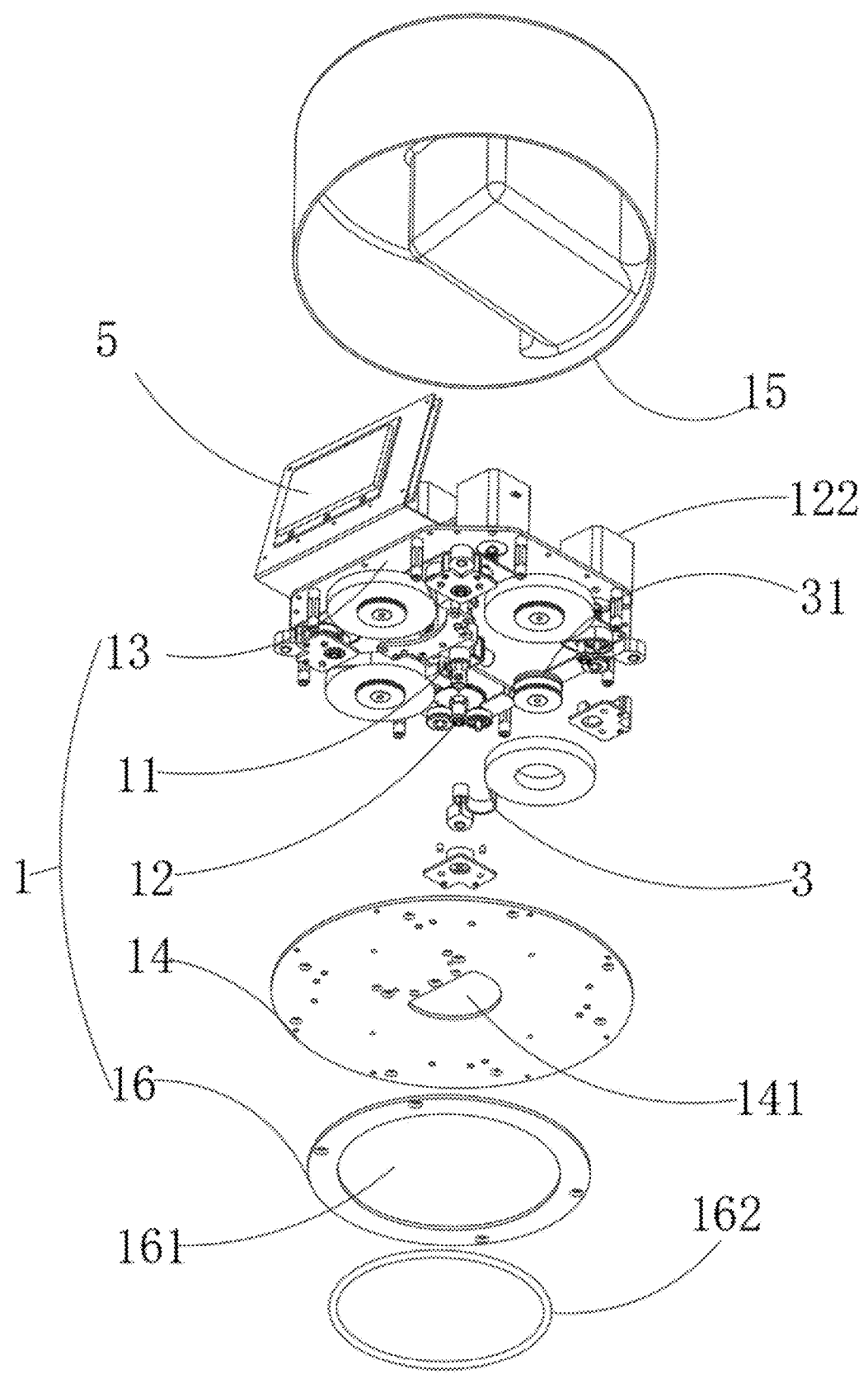
FIG. 6 is an exploded structural schematic diagram of a main body according to one embodiment of the present disclosure.
Figure 7:
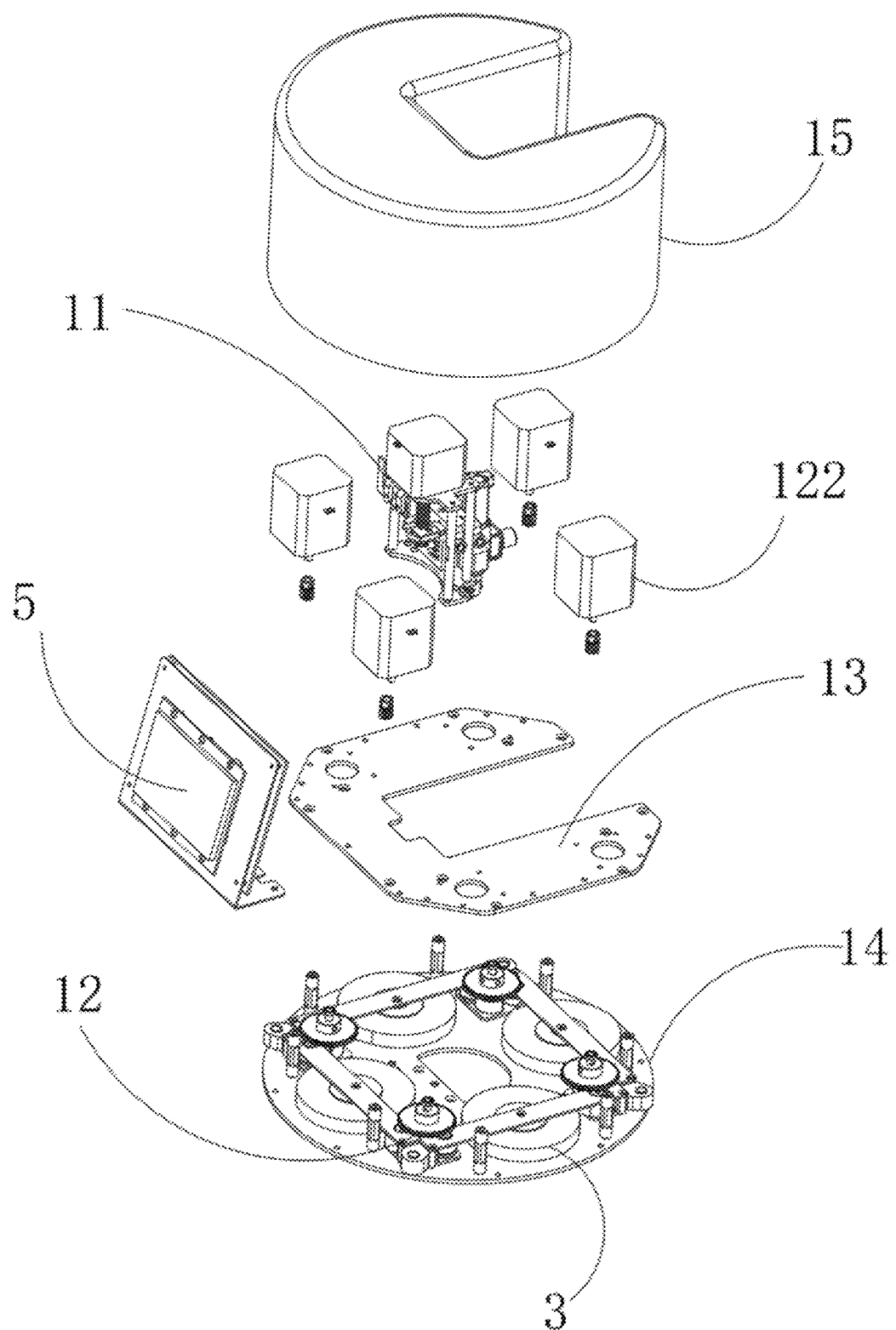
FIG. 7 is another exploded structural schematic diagram of the main body according to one embodiment of the present disclosure.

Referring to FIGS. 5-7, specifically, the main body further includes a housing cover 15, the housing cover 15 is disposed on a top portion of the first supporting component 13 and is detachably connected to the first supporting component 13. As shown in FIG. 7, in the embodiment, the driving component 122 is a servo motor, the driving component 122 is fixedly disposed on the top portion of the first supporting component 13, and an output shaft of the driving component 122 passes through the first supporting component 13, a driving gear is disposed on the output shaft of the driving component 122, the transmission roller component 121 is respectively rotatably connected to the first supporting component 13 and the second supporting component 14 through two ends of a first rotating shaft. A driven gear 124 is disposed on the first rotating shaft, and the driven gear 124 is engaged with the driving gear.

Figure 8:
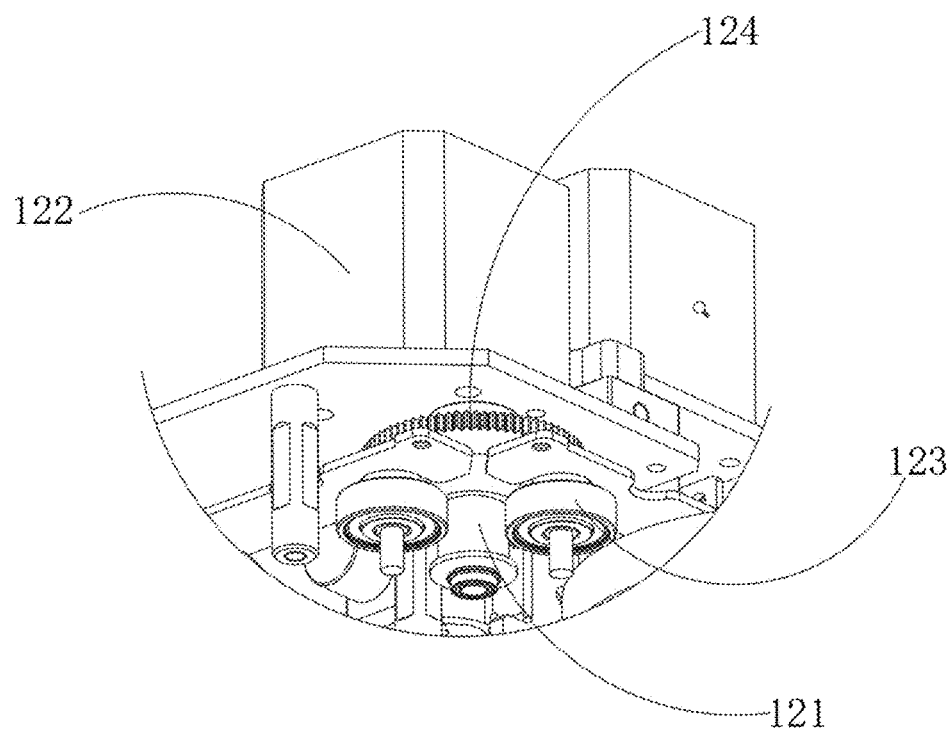
FIG. 8 is a structural schematic diagram of a traction mechanism according to one embodiment of the present disclosure.

As shown in FIG. 8, in some embodiments, the output shaft of the driving component 122 passes through the first supporting component 13. A driving pulley 125 is disposed on the output shaft of the driving component 122, a driven pulley 126 is coaxially disposed with the transmission roller component 121, the driving pulley 125 is connected to the driven pulley 126 through a synchronous belt 127, in order to keep the synchronous belt 127 in a tightened state, a synchronous belt locking mechanism 128 is further provided for limiting the synchronous belt 127. The synchronous belt locking mechanism 128 includes a rocker arm 1281, a middle portion of the rocker arm 1281 is rotatably connected to the first supporting component 13, a tension roller 1282 is disposed at a first end of the rocker arm 1281, the tension roller 1282 and the driving pulley 125 share the same axial direction, and the tension roller 1282 is driven to gradually tighten the synchronous belt 127 from outside to inside through turning a second end of the rocker arm 1281. A bending portion 1283 is disposed at a second end of the rocker arm 1284, and an arc-shaped travel slot 131 is defined on the first supporting component 13 for matching with the bending portion 1283, the bending portion 1283 extends out of the arc-shaped travel slot 131, which is convenient for users to turn the bending portion 1283 on a surface of the first supporting component 13 to adjust the rocker arm 1281 for locking the synchronous belt 127.

Figure 9:
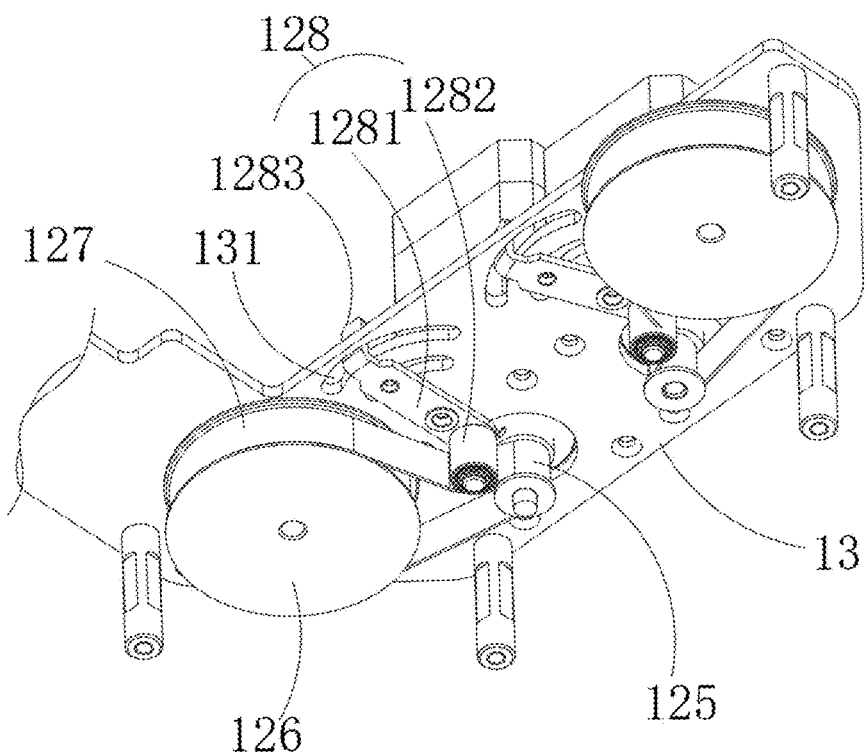
FIG. 9 is a structural schematic diagram of the traction mechanism provided with a synchronous belt for driving according to one embodiment of the present disclosure.
Figure 10:
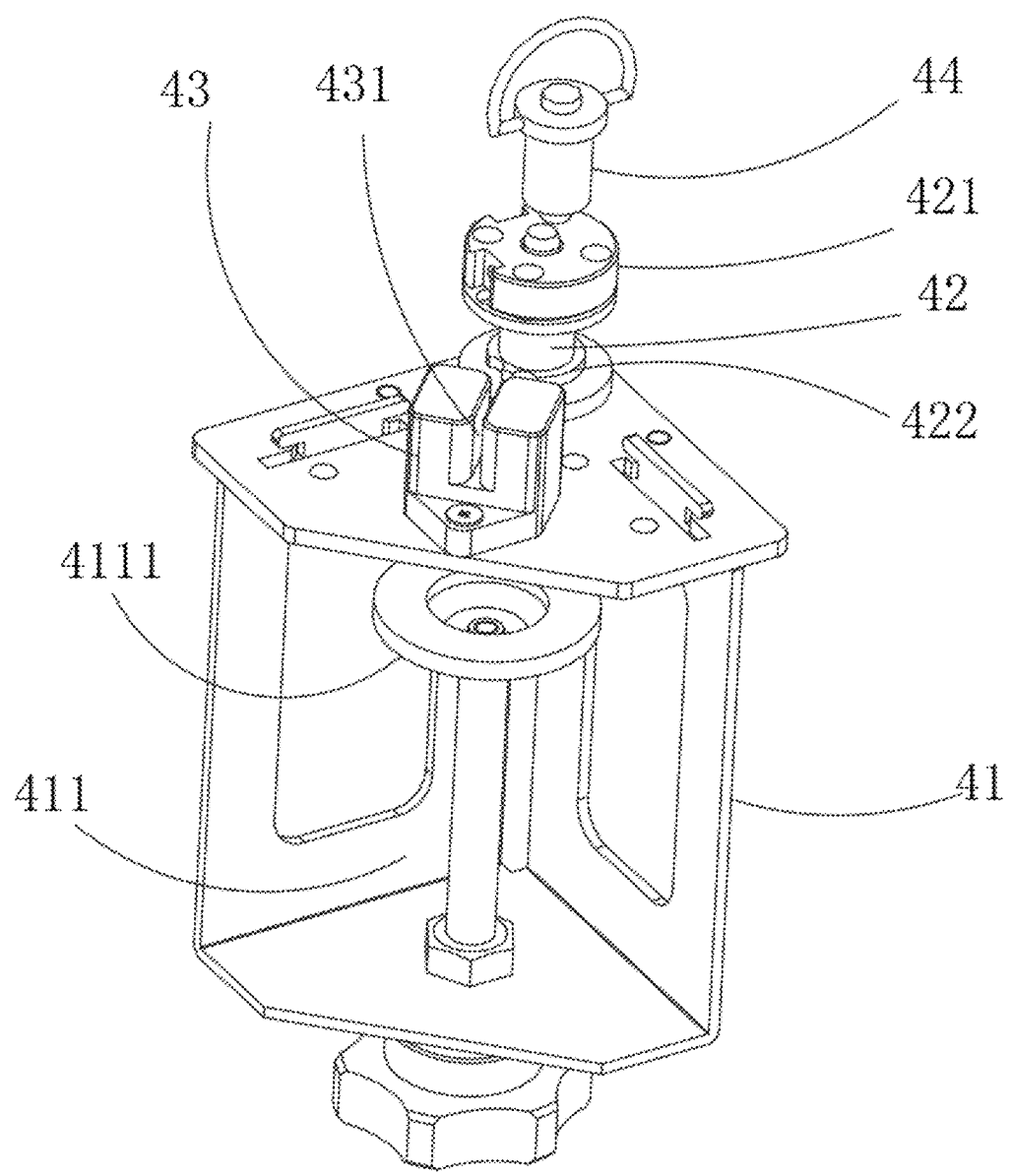
FIG. 10 is a structural schematic diagram of a cable fixture according to one embodiment of the present disclosure.

Referring to FIGS. 9-10, specifically, each of the at least two cable fixtures 4 includes a cable support 41, each cable support 41 is detachably connected to the worktable surface 2, and a transfer connector 42 for connecting to a corresponding one of the at least two cables 3 is disposed on a top portion of each cable support 41. Specifically, each cable support 41 defines a clamping opening 411 for a corresponding corner of the worktable surface 2, a squeezing component 4111 is disposed at a first side of each clamping opening 411, each clamping opening 411 is configured to be clamped into the corresponding corner of the worktable surface 2, a second side of each clamping opening 411 is pressed against the corresponding corner of the worktable surface 2 through a corresponding squeezing component 4111, each squeezing component 4111 is movably connected to a corresponding cable support 41 through a bolt, and the bolt is rotated to drive the squeezing component 4111 to ascend or descend. When a single soft material is provided, such as a diaphragm like a mobile phone film, a size of the diaphragm is adapted to the worktable surface 2, and the diaphragm is capable of being fixed on the worktable surface 2 at the same time through the at least two cable fixtures 4.

Referring to FIGS. 9-10, specifically, each of the at least two cable fixtures 4 further includes a clamping base 43, each clamping base 43 is detachably connected a corresponding cable support 41, and each clamping base 43 includes a clamping portion 431 for clamping the corresponding one of the at least two cables 3 to limit displacement of the corresponding one of the at least two cables 3. In one embodiment, each clamping portion 431 is a U-shaped groove matching with the corresponding one of the at least two cables 3, and each clamping base 43 is not disposed on a line where the corresponding transfer connector 42 and the at least one traction mechanism 12 are aligned, so as to prevent the corresponding one of two cables 3 from swinging or shaking when being wound on the corresponding transfer connector 42 to further prevent each of two cables 3 from displacing with respect to the corresponding transfer connector 42. In another embodiment, each clamping portion 431 is a clamping tool that is manually adjusted to clamp the corresponding one of the two cables 3.

Referring to FIGS. 9-10, each of the at least two cable fixtures 4 further includes a limiting component 44, each transfer connector 42 is rotatably connected to the corresponding cable support 41, and each limiting component 44 is configured to limit rotation of the corresponding transfer connector 42. It should be noted that the at least two cables 3 in the embodiments are synchronous toothed belts, the transmission roller component 121 and each transfer connector 42 are pulleys, and the pulleys and the synchronous toothed belts are engaged for transmission, so that slipping is avoided to a great extent during the transmission, and a driving shaft and a driven shafts are ensured to maintain synchronization. Each transfer connector 42 is rotatably connected to a top portion of the corresponding cable support 41 through a second rotating shaft, a first limiting wheel 421 is disposed on a top portion of each transfer connector 42, a second limiting wheel 422 is disposed on a bottom portion of each transfer connector 42, and each second limiting wheel 422 is fixedly connected to the corresponding cable support 41. The bottom portion of each transfer connector 42 is rotatable with respect to a top portion of the corresponding second limiting wheel 422, an outer ring of each first limiting wheel 421 and an outer ring of each second limiting wheel 422 are both larger than the corresponding transfer connector 42, limiting grooves 4211 are respectively defined on each first limiting wheel 421 and each second limiting wheel 422. In one embodiment, each limiting component 44 is a pin matching with each of the limiting grooves 4211, and each pin is correspondingly inserted into a corresponding one of the limiting grooves 4211, so that the corresponding transfer connector 42 cannot rotate. Each of the at last two cables 3 are accommodated between the corresponding transfer connector 42 and a corresponding pin, so as to facilitate mounting and debugging of the at least two cables 3.

Figure 11:
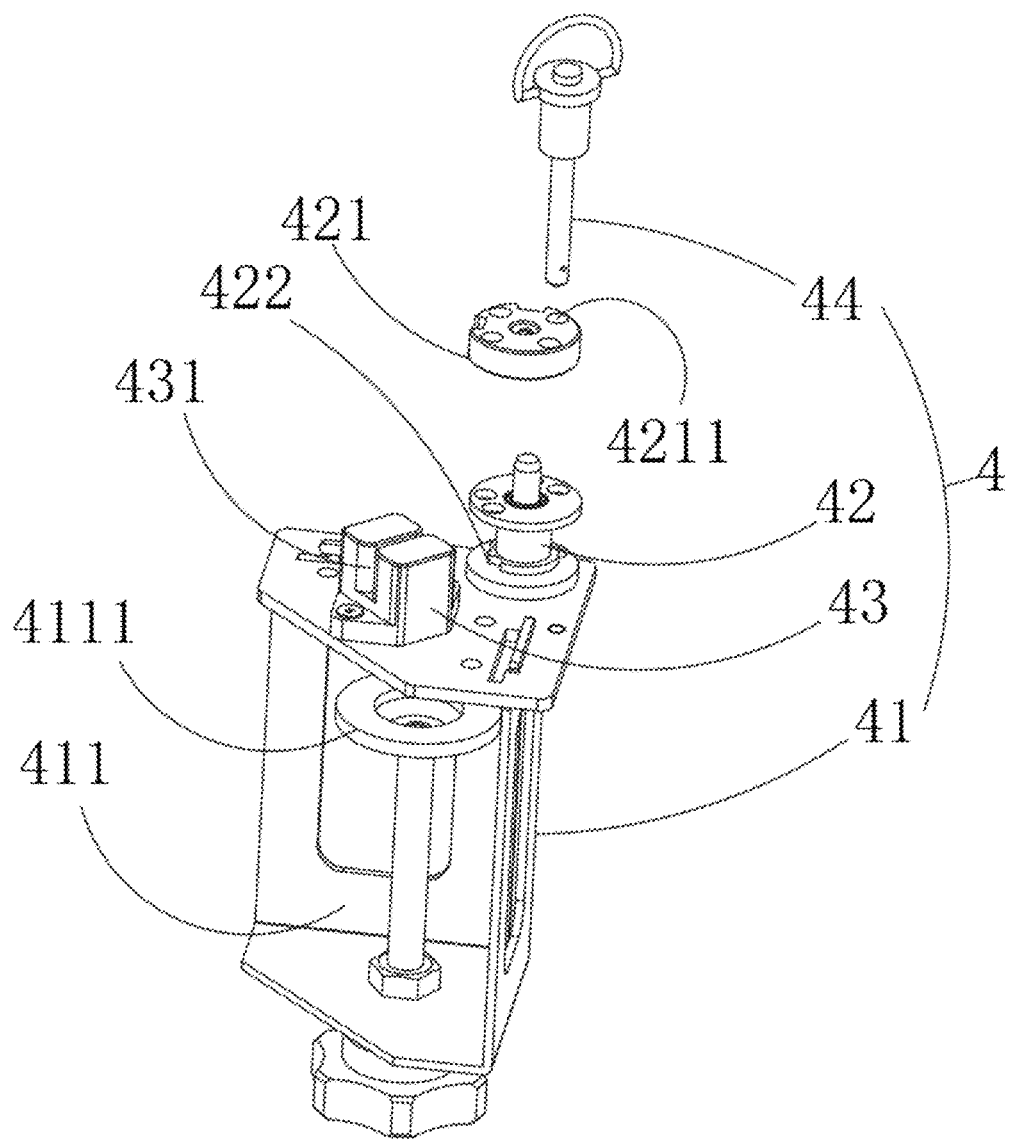
FIG. 11 is an exploded structural schematic diagram of the cable fixture according to one embodiment of the present disclosure.

Referring to FIG. 11, in one embodiment, four cable fixtures 4 and two cables 3 are provided, for convenience of cable travel synchronization and quickly mounting each of the two cables 3 onto the corresponding transfer connector 42, in some embodiments, each transfer connector 42 is a fixing pin 423. Correspondingly, a cable clamp 32 is disposed on the corresponding one of the two cables 3, each cable clamp 32 includes a cable clamp body 321 and a cable clamp cover 322. A top portion of each cable clamp body 321 is detachably connected to a corresponding cable clamp cover 322. A through groove 3211 matching with each fixing pin 423 is defined on a middle of the corresponding cable clamp body 321, a first channel 3212 surrounding an outer side of each through groove 3211 is further defined on the cable clamp body 321, each first channel 3212 is communicated with one side of an outer portion of the corresponding cable clamp body 321, a second channel 3213 is further defined on each cable clamp body 321, a first end of each second channel 3213 is communicated a corresponding first channel 3212, a communication position thereof is a corner 3124 bending less than 90 degrees, and a second end of each second channel 3213 is communicated with the one side of the outer portion of the corresponding cable clamp body 321, each second channel 3213 and each first channel 3212 are matched with the corresponding one of the at least two cables 3, each of the at least two cables 3 is inserted into the first channel 3212 through a first side of the corresponding cable clamp body 321 and loops around a corresponding through groove 3211 and then exits from a second side of the corresponding cable clamp body 321 through a corresponding second channel 3213, entry and exit points for each of the at least two cables 3 are diagonally disposed, and each cable clamp cover 322 is finally connected to the corresponding cable clamp body 321, and then each cable clamp 32 is inserted into a corresponding fixing pin 423 through the corresponding through groove 3211.

Figure 12:
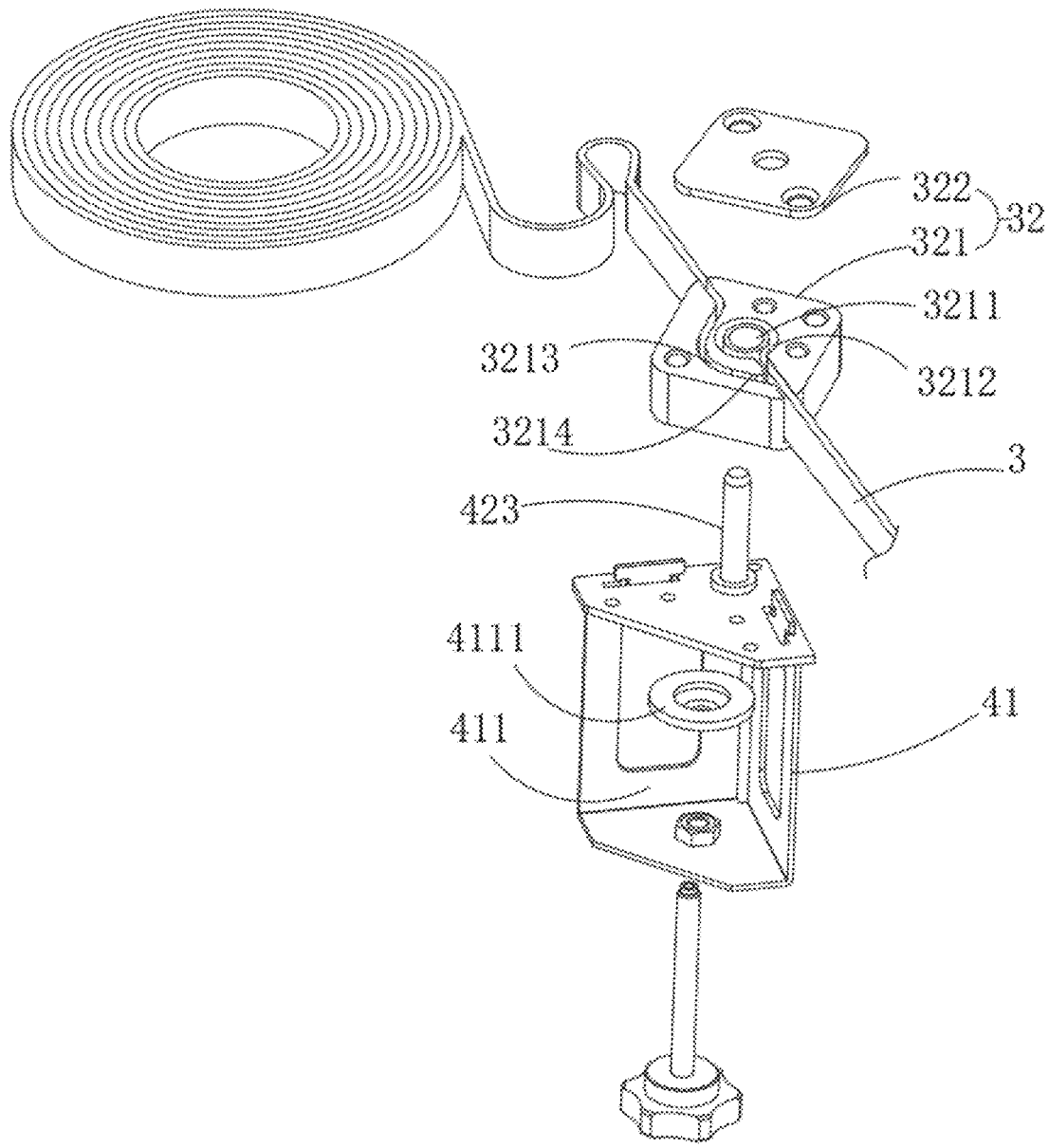
FIG. 12 is an exploded structural schematic diagram of a synchronous belt locking mechanism according to one embodiment of the present disclosure.
Figure 13:
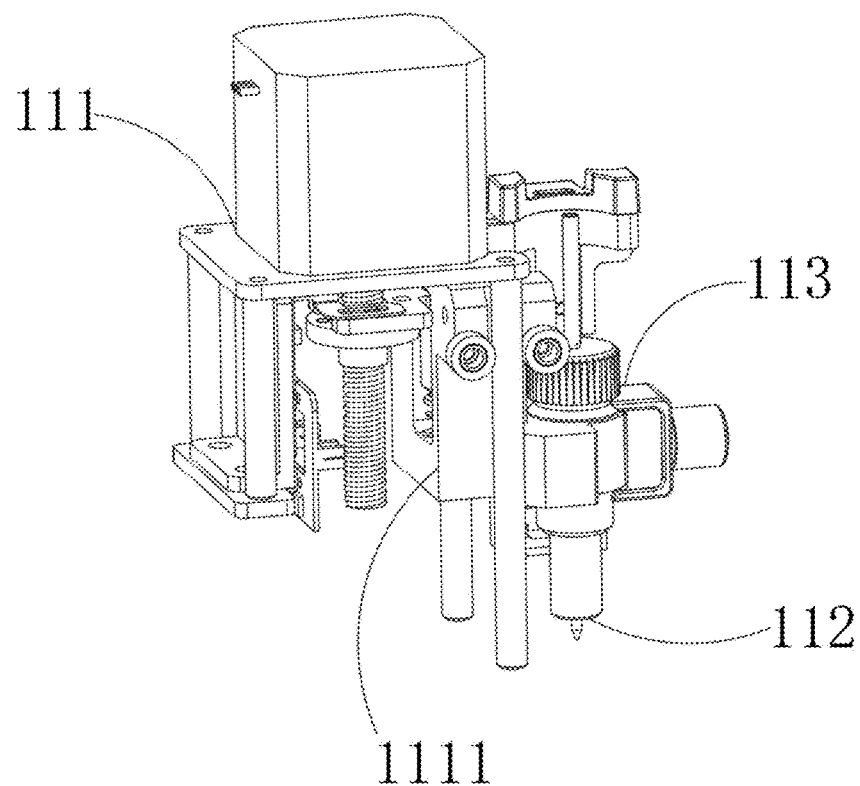
FIG. 13 is a structural schematic diagram of a cutting assembly according to one embodiment of the present disclosure.

Referring to FIGS. 12-13, specifically, the cutting assembly 11 includes a lifting and driving mechanism 111, a cutting tool 112, and a power component 113 for driving the cutting tool 112. A sliding base is disposed at a sliding end 1111 of the lifting and driving mechanism 111, the sliding base is rotatably connected to the cutting tool 112. The power component 113 is disposed at the sliding base and is coupled to the cutting tool 112 for transmission, the lifting and driving mechanism 111 drives the cutting tool 112 to slide in a vertical direction, the power component 113 provides power to the cutting tool 112 to drive the cutting tool 112 to cut downward, so as to cut materials on the worktable surface 2. It should be noted that the cutting tool 11 is selected from a scribing tool for marking lines, a laser processing tool, a CNC processing tool, a die-cutting too, etc.

It should be noted that the lifting and driving mechanism 111 in the embodiments is a vertical slider in the prior art. The vertical slider includes a servo motor, a reducer, a ball screw, a cross-roller guide, and a slider main body 1. The servo motor serves as a power source, the reducer is configured to convert high-speed rotation into low-speed and high-torque output drive the ball screw. The ball screw is configured to convert rotational motion of the servo motor into linear motion, a nut of the ball screw is connected to the cross-roller guide and moves in a vertical direction along with rotation of the screw. The cross-roller guide is configured to provide high-precision guidance and support for the vertical slider, which ensures stability and accuracy during vertical movement of the vertical slider.

Figure 14:
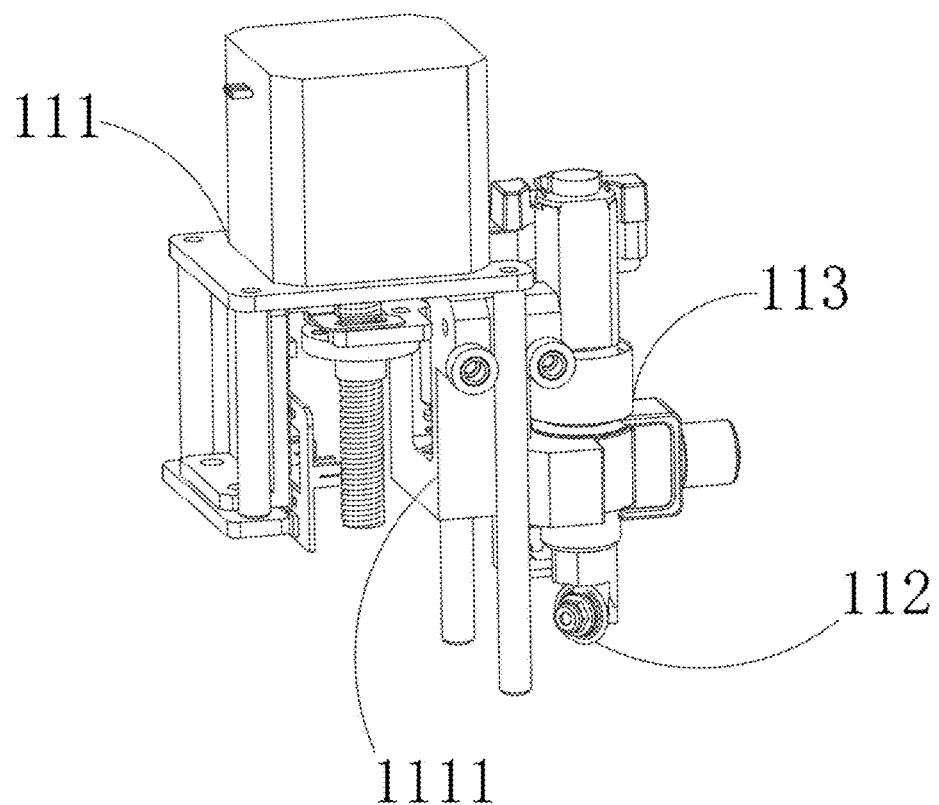
FIG. 14 is another structural schematic diagram of the cutting assembly according to one embodiment of the present disclosure.
Figure 15:
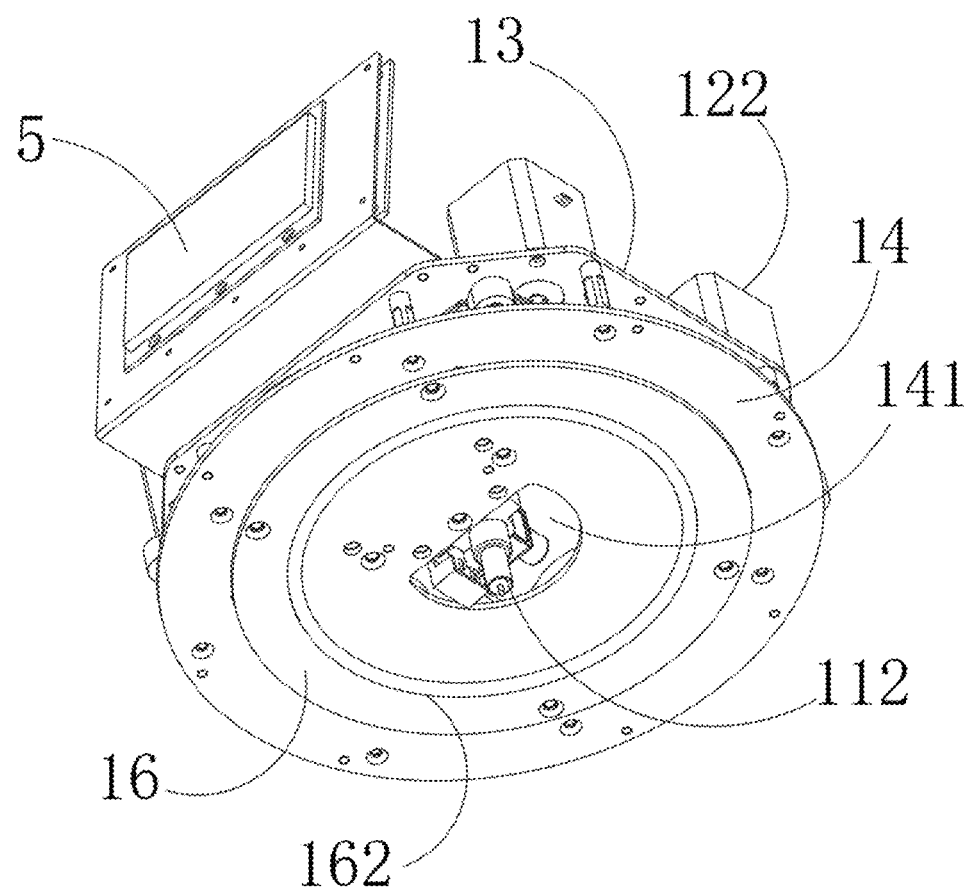
FIG. 15 is a structural schematic diagram of the main body according to one embodiment of the present disclosure.

Referring to FIG. 14, specifically, the main body 1 further includes a pad 16, the pad 16 slides in contact with the worktable surface 2 or a surface of a soft material to be processed, the pad 16 is disposed at a bottom portion of the second supporting component 14, a first movable opening 161 is defined on a middle portion of the pad 16, second movable openings 141 are respectively defined on a middle portion of the first supporting component 13 and a middle portion of the second supporting component 14 for matching the cutting assembly 11. The cutting assembly 11 passes through the first movable opening 161 and the second movable openings 141 to cut the materials on the worktable surface 2. A sliding ring 162 is disposed on a bottom portion of the first movable opening 161 for smoothly connected to the worktable surface 2. Specifically, when the soft material to be processed fully covers the worktable surface 2, the pad 16 comes into contact with a surface of the soft material to be processed through, but not limited to, the sliding ring 162. In one embodiment, a bottom portion of the sliding ring 162 is rounded to avoid scratching the surface of the soft material to be processed. In addition to proving the sliding ring 162, in some embodiments, swivel casters are further provided for rolling instead of sliding. It should be noted that a purpose of defining the first movable opening 161 in the middle portion of the pad 16 is to allow the cutting assembly 11 to be positioned in a center of the main body 1, which is convenient for determining a starting point of cutting.

The above description of the disclosed embodiments enables those who skilled in the art to implement or use the present disclosure. Various modifications to these embodiments are apparent to those who skilled in the art, and general principles defined herein may be implemented in other embodiments without departing from a spirit or scope of the present disclosure. Thus, the present disclosure is limited to the embodiments shown herein but is to be accorded a widest scope consistent with principles and novel features disclosed herein.

What is claimed is:

1. A portable soft material cutting device, comprising:
    a main body;
    at least two cables;
    at least one cable reeling module;
    at least two cable fixtures; and
    a control module;
    wherein the main body is placed on a worktable surface and comprises a cutting assembly and at least one traction mechanism;
    the at least one cable reeling module is disposed on the main body or the worktable surface, and the at least two cables are connected to the at least one cable reeling module;
    the at least two cable fixtures are disposed on the worktable surface, each of the at least two cables is connected to a corresponding one of the at least two cable fixtures;
    the at least two cables are coupled to the at least one traction mechanism for transmission; and
    the control module is configured to control the at least one traction mechanism to pull the at least two cables, and the at least one cable reeling module is configured to reel the at least two cables in and out, so as to control the main body to move on the worktable surface and further control the cutting assembly to operate on the worktable surface.

2. The portable soft material cutting device according to claim 1, wherein four cable reeling modules and two cables are provided, each two of the four cable reeling modules are respectively disposed at two ends of a corresponding one of the two cables, and the four cable reeling modules are disposed on the main body;
    four cable fixtures are provided, the four cable fixtures are respectively disposed at four corners on the worktable surface, each of the two cables is connected to corresponding two of the four cable fixtures; and
    four traction mechanisms are further provided, each of the four traction mechanisms is disposed between a corresponding one of the four cable fixtures and a corresponding one of the four cable reeling modules, and corresponding two of the four traction mechanisms are connected to the corresponding one of the two cables.

3. The portable soft material cutting device according to claim 2, wherein the four cable reeling modules respectively comprise four winding drums, the two cables are respectively connected to the four winding drums, four elastic reset components are respectively disposed in the four winding drums, an inner ring of each of the four winding drums is connected to a movable end of a corresponding one of the four elastic reset components, a fixed end of each of the four elastic reset components is connected to the main body, elastic reset force of the four elastic reset components keep the two cables taut and wound on the four winding drums.

4. The portable soft material cutting device according to claim 1, wherein four cable fixtures and four cables are provided;
    a first end of each of the four cables is connected to the at least one cable reeling module, a second end of each of the four cables is connected to a corresponding one of the four cable fixtures; and
    a middle portion of each of the four cables is coupled to the at least one traction mechanism for transmission.

5. The portable soft material cutting device according to claim 1, wherein two cable fixtures and two cables are provided, a first end of each of the two cables is connected to the at least one cable reeling module, a second end of each of the two cables is connected to a corresponding one of the two cable fixtures, the at least one traction mechanism is disposed between the two cable fixtures and the at least one cable reeling module and is connected to the two cables.

6. The portable soft material cutting device according to claim 1, wherein the control module is disposed on the main body, or wirelessly interacts with the main body.

7. The portable soft material cutting device according to claim 1, wherein the main body comprises a first supporting component and a second supporting component;
   two traction mechanisms are provided, the two traction mechanisms are disposed between the first supporting component and the second supporting component;
   each of the two traction mechanisms comprises a transmission roller component, a driving component, and limiting roller components;
   each transmission roller component is rotatable and is disposed between the first supporting component and the second supporting component;
   each driving component is coupled to a corresponding transmission roller component to drive a corresponding transmission roller component to rotate; and
   each of the two cables is looped in a U-shape around one half-circle of the corresponding transmission roller component, corresponding limiting roller components are respectively disposed at two sides of the U-shape, the corresponding limiting roller components are rotatable and are disposed between the first supporting component and the second supporting component to prevent a corresponding one of the two cables from slipping off the corresponding transmission roller component.

8. The portable soft material cutting device according to claim 1, wherein each of the at least two cable fixtures comprises a cable support, each cable support is detachably connected to the worktable surface, and a transfer connector for connecting to a corresponding one of the at least two cables is disposed on a top portion of each cable support.

9. The portable soft material cutting device according to claim 8, wherein each of the at least two cable fixtures further comprises a clamping base, each clamping base is detachably connected a corresponding cable support, and each clamping base comprises a clamping portion for clamping the corresponding one of the at least two cables to limit displacement of the corresponding one of the at least two cables.

10. The portable soft material cutting device according to claim 9, wherein each of the at least two cable fixtures further comprises a limiting component, each transfer connector is rotatably connected to the corresponding cable support, and each limiting component is configured to limit rotation of a corresponding transfer connector.

* * * * *